Aug. 23, 1932.  H. G. PROCUNIER  1,873,476
TAP HOLDER
Filed Feb. 16, 1931
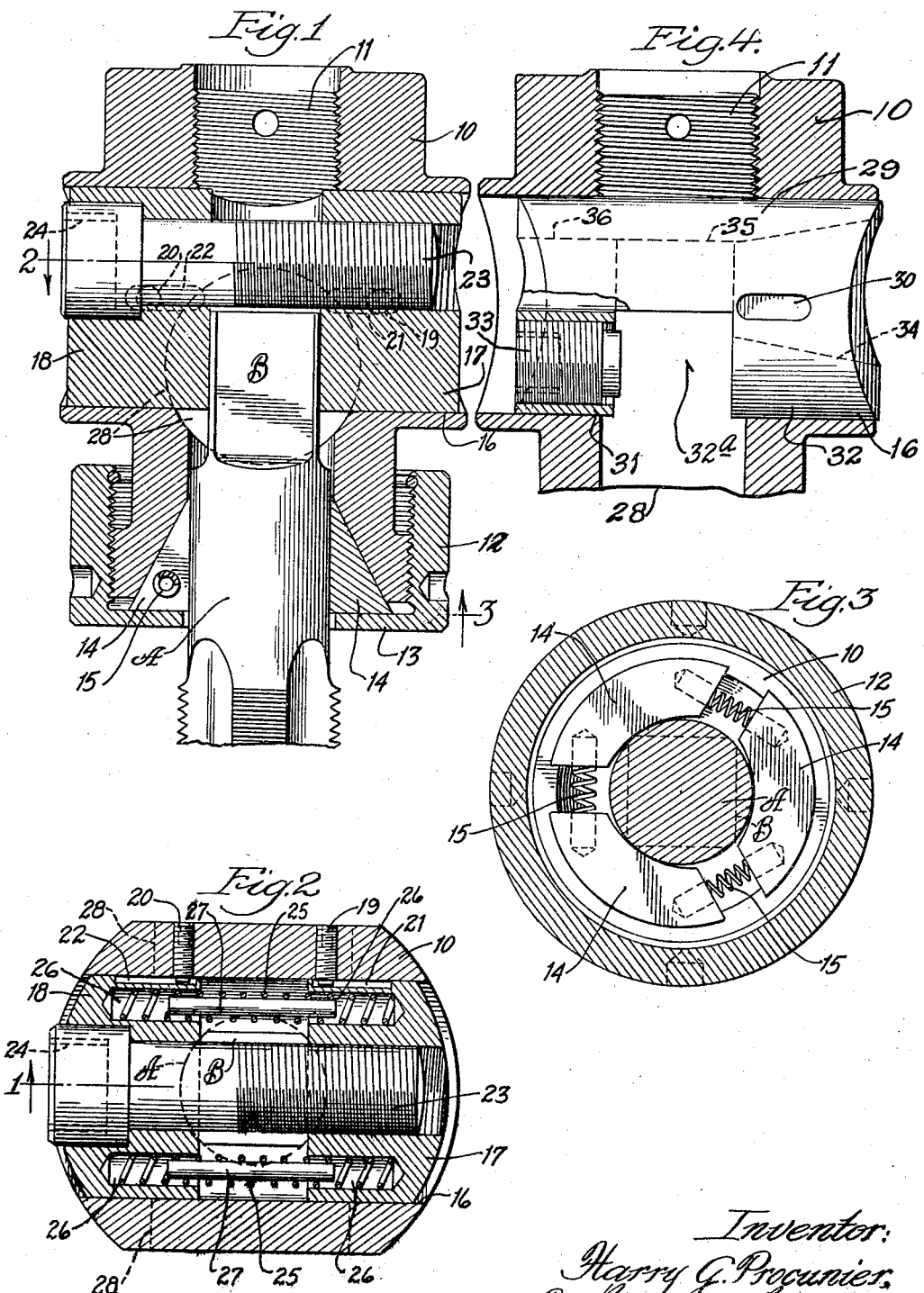

Patented Aug. 23, 1932

1,873,476

UNITED STATES PATENT OFFICE

HARRY G. PROCUNIER, OF CHICAGO, ILLINOIS, ASSIGNOR TO PROCUNIER SAFETY CHUCK COMPANY, OF CHICAGO, ILLINOIS, A CORPORATION OF ILLINOIS

TAP HOLDER

Application filed February 16, 1931. Serial No. 515,942.

An object of this invention is to provide a simple and efficient form of tap holder, and one which is inexpensive to manufacture.

This and other objects, as will hereinafter appear, are accomplished by this invention which is fully described in the following specification and shown in the accompanying drawing, in which Fig. 1 is a longitudinal section on the line 1 of Fig. 2;

Fig. 2 is a transverse section on the line 2 of Fig. 1;

Fig. 3 is a transverse section on the line 3 of Fig. 1; and

Fig. 4 is a view partly in section illustrating a modified form of the gripping member shown in Fig. 1.

The embodiment illustrated in Figs. 1 to 3 comprises a tap holder having a body member 10 provided at its upper end with a tapped axial opening 11 by which the tap holder may be secured to a threaded end of a driving shaft (not shown). The lower end of the body 10 is threaded to receive a collar 12 which has an end 13 passing around the lower end of the body 10 and enclosing a series of three jaws 14 which are urged apart by means of springs 15. The jaws 14 are forced inwardly by screwing in the collar 12, and are thereby enabled to grip the shank A of a tap to be held by the tap holder. This tap when gripped lies in axial alignment with the center of the body 10, and with the axis of the shaft which is screwed into the tap opening 11.

Having thus centered and gripped the shank of the tap it is necessary to provide a means for driving the tap through its flattened and squared end B, and one which will automatically make allowances for any variations due to manufacture. To accomplish this the body is provided with a transverse bore 16 in which are slidably mounted gripping members 17 and 18. These members are retained therein by means of dog point set screws 19, 20 which engage slots 21, 22, and which serve also to prevent these members from rotating, but permit them to slide longitudinally of the opening 16.

A screw 23 is rotatably mounted in the gripping member 18 and is screw-threaded into the member 17. It is provided with a socket opening 24 which is adapted to engage a suitable wrench by which it may be turned to vary the distance between the members 17 and 18. The members 17 and 18 carry springs 25 which are adapted to slide into holes 26 in the opposing members, and within these springs lie pins 27 which prevent the springs from buckling while they constantly urge these members apart. The screw 23 is placed eccentrically with respect to these members, as shown in Fig. 1, so as to permit the squared end B of the tap shank to pass up between the gripping members.

It will thus be seen from the foregoing that the tap holder is normally retained in place on its driving shaft, and that its operation is as follows: To grip a tap thereby, the members 17, 18 are separated sufficiently to permit the squared or flattened end B to be inserted therebetween, after which the collar 12 is screwed up so as to force the jaws 14 firmly into contact with the shank A of the tap. If desired, a suitable spanner wrench is used to further tighten this collar. The screw 23 is then tightened so as to force the gripping members 17, 18 firmly into engagement with the opposed parallel faces of the flattened end B.

The body 10 is also provided with a bore 28 which enables the operator to see both the inner faces of the gripping members 17, 18 and the flattened end B of the tap. He is thus able to turn the tap so as to bring its faces parallel to the gripping faces of the members 17, 18.

In Fig. 4 is shown a modified form of the invention in which the body 10 is the same except for the omission of the bore 28, and in which there is a single gripping member 29 having a lateral slotted opening 30 which is adapted to engage the set screw 20. This member has two fixed opposed portions 31, 32 separated by a slot 32ª, the portion 31 having a screw-threaded gripping member 33 which is adapted to be turned so as to vary the distance between the screw and the opposing gripping face of the portion 32, thereby gripping the squared tap end B placed therebetween.

The member 29 may be provided with a tapered opening 34 in the end 32 for observing the end of the tap as it enters the slot 32ª. In making the opening 34 it is preferably started as a drilled hole 35 which may be stopped at or near the inner end of the portion 32, and, if desired, the hole 36 may be drilled in from the outer end of the portion 31 eccentrically to 35.

Thus it will be seen that with the form shown in Fig. 4, the member 29 moves to accommodate itself to taps of various sizes, and that any variation in the depths of the cuts which produce the flattening on the opposing faces of the shank will likewise be accommodated. Thus a simple and efficient form of tap holder is provided wherein the shank of the tap is centered and aligned by one form of mechanism, while the tap itself is driven by another which readily accommodates itself to any variations which may occur in the manufacture of the tap.

While I have shown and described but a few embodiments of my invention, it is to be understood that it is capable of many modifications. Changes, therefore, in the construction and arrangement may be made which do not depart from the spirit and scope of the invention as disclosed in the appended claim.

I claim:

A tap holder comprising a body having means adapted to hold a tap in axial alignment therewith, said body having a transverse bore, a member slidable in said bore and having a slot adapted to receive the flattened end of a tap shank, and means carried by said member for gripping said flattened end against one side of said slot, said member having a hole above said gripping member and communicating with said slot through which the end of said tap may be observed.

HARRY G. PROCUNIER.